Patented Nov. 29, 1949

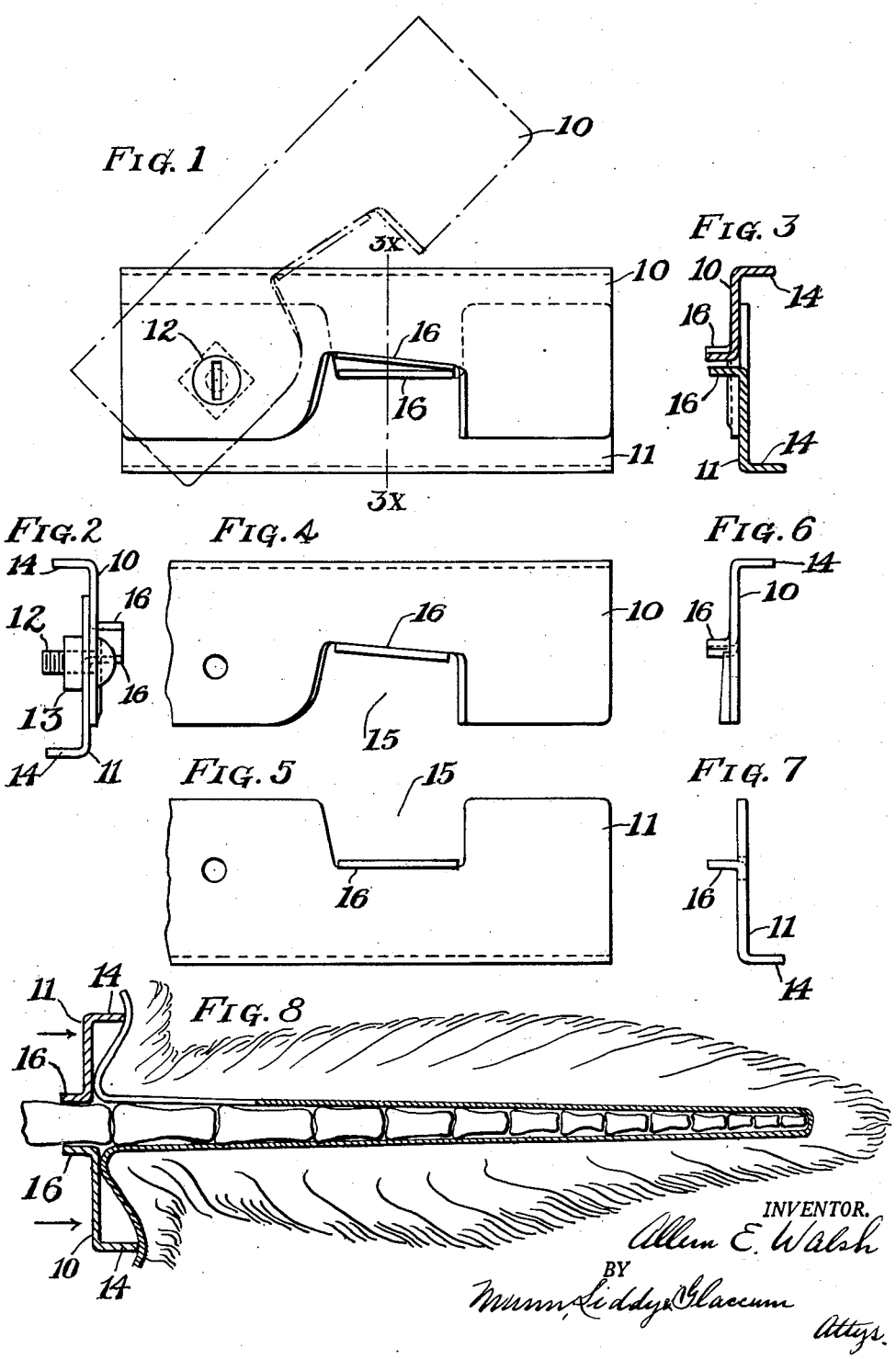

2,489,734

UNITED STATES PATENT OFFICE 2,489,734

TAIL SKINNER

Allen E. Walsh, Fallon, Nev.

Application September 17, 1946, Serial No. 697,470

3 Claims. (Cl. 17—21)

This invention relates to a device for removing skin from the tail bone of a fur bearing animal.

The most difficult part in the operation of removing the pelt of a fur bearing animal is that of separating the tail portion from the tail bone. Because of the tail structure of a carcass this part of an animal skin may be easily damaged even by an expert skinner thus lessening the appearance of the pelt and its ultimate value.

My present invention has for its object to provide a device especially designed for the use of both expert skinners and amateur hunters and trappers by means of which the skinning of the tail portion of a fur bearing animal may be performed expeditiously in a manner that will insure it against distortion resulting from crooked or spiral knife cuts or like injuries.

More specifically stated my invention embodies a device which may be grasped in the hand comprising jaws having registering openings for the reception of the tail bone, the opposing edges of which are flanged for the purpose of stripping the skin from the tail bone as the jaws are squeezed together in a closed relation.

To these and other ends my invention embodies further improvements all as will be described in the accompanying specification, the novel features thereof being set forth in the appended claims.

In the drawings—

Figure 1 is a side elevation of a tail skinner embodying my present invention, the jaws being shown closed in full lines and in their open position by dotted lines.

Figure 2 is an end view thereof.

Figure 3 is a vertical sectional view taken on the line 3×—3× of Fig. 1.

Figures 4 and 5 are side views of the upper and lower jaws respectively.

Figures 6 and 7 are end views of the upper and lower jaws.

Figure 8 is a view showing the tail structure of an animal and illustrating the device in use.

A device embodying my invention is a development of the so-called tail skinner of my Patent #2,261,749 granted November 4, 1941, to which reference is also made for many of the advantages to be found in a device of this general construction.

The improved tail skinner of the present invention consists of an upper jaw 10 and a lower jaw 11. Each of these jaws consists of a substantially rectangular metal plate. The jaws are approximately of the same size and are connected side by side in contacting and overlapping relationship for pivotal opening and closing movement by a headed screw bolt 12 provided with a nut 13. The bolt 12 extends through the jaws near one end of the device.

The outer longitudinal edge portion of each jaw is bent at a right angle providing a flange 14 which serves as a convenient means for gripping the jaws of the device when closed for the skinning operation.

The jaws have substantially centrally located elongated rectangular registrable notches 15 extending through the inner longitudinal edges of the jaws to define a substantially long rectangular opening to receive an animal tail, and there being cooperative opposed straight flanged edges 16 of the notches 15 adapted to strip the skin from a tail bone when the device is closed thereon and pulled along the tail toward the tip thereof. The flanged edge 16 on the upper jaw 10 is disposed at an angle with respect to the longitudinal axis of the jaw and the flanged edge 16 on the lower jaw is disposed approximately parallel to the longitudinal axis of the jaws. Therefore when the jaws 10 and 11 are in the closed relation in engagement with the skin on the tail bone the flanged edges 16 will be parallel to each other for stripping action.

The device is used and operates as follows. The first act of the trapper in removing a pelt is to skin the hind legs of the animal and partly down its body until the tail skin stops him. He then splits the tail skin from one to three inches on the underside of the tail, depending upon the kind of an animal that is being skinned. Some animals are more difficult to skin than others even among their own species. He then cuts the ligaments that hold the skin around the tail, and then pulls the skin off as far as it has been split. This makes room for the present device on the tail bone. The upper jaw 10 goes on top while the lower jaw 11 goes on the under side of the tail bone. The user grabs the tail bone near the animal's body with one hand while the device is grasped in the other hand. A pulling motion indicated by arrows in Fig. 8 is performed which causes the flanged edges 16 to strip the skin off. The diminishing or tapering shape of the tail is compensated by the closure of the device under hand pressure. This pressure persists all the way out to the tip of the tail. The opposed flanged edges 16 are of substantial width compared to the length of the vertebrae which prevents the device from becoming locked in the joints or cutting into the tail bone between the joints, and the long rectangular opening defined by the notches 15, when the jaws are in a closed relationship, makes it easier to strip the skin from the tail bone.

I claim:

1. A tail skinner comprising a pair of jaws having registrable notches to define a substantially long rectangular opening to receive an animal tail, and means connecting the jaws for the registration of said notches providing opposed straight skin stripping edge portions, the connection of the jaws being in contacting and overlapping relationship for relative movement of the jaws into progressively diminishing size of said opening as the skinner is drawn toward the tip of the tail.

2. A tail skinner as defined in claim 1, wherein said edge portions of said notches are flanged to facilitate the skin stripping movement of the skinner.

3. A tail skinner as defined in claim 1, wherein said edge portions of said notches each has a rearwardly extending flange to facilitate the skin stripping movement of the skinner.

ALLEN E. WALSH.

REFERENCES CITED

The following references are of record in the file of this patent:

UNITED STATES PATENTS

| Number | Name | Date |
|---|---|---|
| 2,261,749 | Walsh | Nov. 4, 1941 |